United States Patent
Sultenfuss et al.

(10) Patent No.: US 11,502,544 B2
(45) Date of Patent: Nov. 15, 2022

(54) HIGH-POWER WIRELESS TRANSMISSION AND CONVERSION

(71) Applicant: Dell Products, L.P., Round Rock, TX (US)

(72) Inventors: Andrew Thomas Sultenfuss, Leander, TX (US); Richard C. Thompson, Cedar Park, TX (US)

(73) Assignee: Dell Products, L.P., Round Rock, TX (US)

(*) Notice: Subject to any disclaimer, the term of this patent is extended or adjusted under 35 U.S.C. 154(b) by 160 days.

(21) Appl. No.: 16/751,819

(22) Filed: Jan. 24, 2020

(65) Prior Publication Data

US 2021/0234402 A1 Jul. 29, 2021

(51) Int. Cl.
*H02J 50/10* (2016.01)
*G06F 1/26* (2006.01)
*H02J 7/02* (2016.01)

(52) U.S. Cl.
CPC ............. *H02J 50/10* (2016.02); *G06F 1/26* (2013.01); *H02J 7/02* (2013.01)

(58) Field of Classification Search
CPC ........ H02J 50/10; H02J 50/80; H02J 2207/40; H02J 7/025; H02J 50/12; H02J 7/00; H02J 7/0047; H02J 7/0048; H02J 7/02; H02J 2207/30; G06F 1/266; G06F 1/263; G06F 1/26; G06F 1/3212; G06F 13/4282
USPC .............................. 307/26; 700/295; 713/300
See application file for complete search history.

(56) References Cited

U.S. PATENT DOCUMENTS

| | | | |
|---|---|---|---|
| 2003/0101303 A1* | 5/2003 | Kung | G06F 1/1626 713/300 |
| 2012/0210150 A1* | 8/2012 | de Lind van Wijngaarden | G06F 9/4893 713/320 |
| 2014/0245808 A1* | 9/2014 | Pradhan | G01L 27/002 73/1.08 |
| 2015/0349624 A1* | 12/2015 | Wang | H02M 1/4225 363/21.09 |
| 2016/0064979 A1* | 3/2016 | Huang | H02J 7/0029 320/114 |
| 2016/0118834 A1* | 4/2016 | Swope | H02J 7/00034 320/108 |
| 2016/0329746 A1* | 11/2016 | Hewelt | H02J 7/00304 |
| 2017/0077734 A1* | 3/2017 | Nokkonen | H02J 50/80 |
| 2017/0117717 A1* | 4/2017 | Pagano | H02J 50/10 |

(Continued)

Primary Examiner — Faisal M Zaman
(74) Attorney, Agent, or Firm — Fogarty LLP

(57) ABSTRACT

Systems and methods provide wireless power to an Information Handling System (IHS). A multimode wireless power transmission unit supports USB-PD (Universal Serial Bus Power Delivery) power transmissions and also supports a high-power transmission of a voltage greater than USB-PD transmission voltages. The IHS detects the wireless coupling of the wireless power transmission unit. As part of this coupling, the IHS determines whether the wireless power transmission unit supports high-power transmissions. A wireless power transfer is negotiated and a power circuit of the IHS is configured for converting the negotiated high-power transmission to an input utilized by the IHS. Embodiments utilize a power circuit that provides efficient conversion of power transmissions of up to 60 volts. This same power circuit also provides efficient conversion of power transmissions of up to 60 volts by a multimode USB-C power adapter.

20 Claims, 4 Drawing Sheets

(56) References Cited

U.S. PATENT DOCUMENTS

| | | | |
|---|---|---|---|
| 2017/0179755 A1* | 6/2017 | Mazooji | H04B 5/0068 |
| 2018/0006498 A1* | 1/2018 | Suzuki | H02J 50/12 |
| 2018/0074564 A1* | 3/2018 | Paparrizos | H02J 9/06 |
| 2018/0165235 A1* | 6/2018 | Park | G06F 13/38 |
| 2018/0189223 A1* | 7/2018 | Nge | G06F 1/3287 |
| 2018/0219635 A1* | 8/2018 | Sipes, Jr. | G02B 6/4246 |
| 2018/0239410 A1* | 8/2018 | Paparrizos | H02J 7/342 |
| 2018/0254700 A1* | 9/2018 | Hu | H02M 3/1584 |
| 2018/0323636 A1* | 11/2018 | Makwinski | H02J 7/0042 |
| 2018/0351405 A1* | 12/2018 | Zhou | H02J 50/12 |
| 2018/0356873 A1* | 12/2018 | Regupathy | G06F 1/266 |
| 2018/0375357 A1* | 12/2018 | Sultenfuss | H02J 7/342 |
| 2019/0027972 A1* | 1/2019 | Gietzold | H02J 50/20 |
| 2019/0068005 A1* | 2/2019 | Wang | H02J 50/10 |
| 2019/0324511 A1* | 10/2019 | Cao | G06F 1/266 |
| 2020/0238032 A1* | 7/2020 | Panarello | A61M 16/1075 |
| 2020/0348723 A1* | 11/2020 | Wood, III | G06F 1/263 |
| 2021/0149468 A1* | 5/2021 | Walsh | H02J 1/10 |

* cited by examiner

HIGH-POWER WIRELESS TRANSMISSION AND CONVERSION

FIELD

This disclosure relates generally to Information Handling Systems (IHSs), and more specifically, to wireless power transmissions for portable IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Certain IHSs, such as laptops, tablets and mobile phones, are portable and are designed to operate using power supplied by rechargeable batteries. Power drawn from an electrical outlet may be used to charge the batteries of a portable IHS. Since the batteries of IHSs operate using DC (Direct Current) power, an AC adapter (i.e., AC/DC adapter or AC/DC converter) is required to convert the AC power from the wall outlet to DC power that can be used to charge the batteries. In some instances, AC adapters may provide DC power to an IHS via a cylindrical, barrel connector that couples with a corresponding DC power port receptable of the IHS. In some instances, DC power may be additionally or alternatively provided via a USB (Universal Serial Bus) coupling. The USB Power Delivery (USB-PD) Specification specifies communications between an AC adapter and an IHS that enable negotiation of various supply voltages that are supported by the AC adapter and that may be provided to the IHS via a USB port.

Until recently, the rechargeable batteries utilized by portable IHSs were charged strictly by physically coupling a wired connection provided by an AC adapter to a port of an IHS. More recently, certain IHSs support wireless charging in which power is transferred to the IHS via a wireless coupling between wireless charging components of the IHS and a charging pad, or other wireless charging unit, on which the IHS is placed on or near. Wireless charging requires transmitting power to an IHS where the transmitted power is converted for use in charging the batteries of the IHS or powering other operations of the IHS. In order to compensate for power lost during this conversion by the IHS, wireless charging units may increase the amount of power that is transmitted to the IHS. However, supporting the wireless transmission of additional power generally requires generating additional heat and also requires the use of larger wireless transmission components.

SUMMARY

In various embodiments, systems are provided for powering an Information Handling System (IHS). The systems may include: a wireless power transmission unit supporting transmission comprising a plurality of USB-PD (Universal Serial Bus Power Delivery) transmissions, and further supporting a high-power transmission of a voltage greater than voltages of the plurality of USB-PD transmissions; and the IHS configured to: detect a coupling of the wireless power transmission unit with a wireless power reception unit of the IHS; when the wireless power transmission unit coupling is detected, determine the wireless power transmission unit supports transmission of the high-power transmission; negotiate the high-power transmission by the wireless power transmission unit; and configure a power circuit of the IHS for converting the negotiated high-power transmission to an input utilized by the IHS.

In additional system embodiments, the high-power transmission comprises a nominal voltage of approximately 54 volts. In additional system embodiments, the high-power transmission comprises a peak voltage of 60 volts. In additional system embodiments, the power circuit comprises a plurality of digital voltage dividers operable for converting the high-power transmission to the input. In additional system embodiments, the configuration of the power circuit comprises selecting a portion of the plurality of digital voltage dividers for use in the conversion. In additional system embodiments, the input generated by the operation of the power circuit comprises greater than 200 watts of power. In additional embodiments, the systems may include: negotiate a USB-PD transmission by the wireless power transmission unit; configure a bypass of the power circuit of the IHS; and route the USB-PD transmission to a battery charger of the IHS.

In various additional embodiments, Information Handling Systems (IHSs) may include: one or more processors; a memory device coupled to the one or more processors, the memory device storing computer-readable instructions that, upon execution by the one or more processors, cause execution of an operating system of the IHS; a wireless power reception unit; and an embedded controller comprising a memory having program instructions stored thereon that, upon execution by a logic unit of the embedded controller, cause the embedded controller to: detect a coupling of a wireless power transmission unit with the wireless power reception unit, wherein the wireless power transmission unit supports transmissions comprising a plurality of USB-PD (Universal Serial Bus Power Delivery) transmissions, and further supports a high-power transmission of a voltage greater than voltages of the plurality of USB-PD transmissions; when the wireless power transmission unit coupling is detected, determine the wireless charging unit supports transmission of the high-power transmission; negotiate the high-power transmission by the wireless power transmission unit; and configure a power circuit of the IHS for converting the negotiated high-power transmission to an input utilized by the IHS.

In additional IHS embodiments, the high-power transmission comprises a nominal voltage of approximately 54 volts. In additional IHS embodiments, the high-power transmission comprises peak voltages of 60 volts. In additional IHS embodiments, the power circuit comprises a plurality of digital voltage dividers operable for converting the high-power transmission to the input. In additional IHS embodiments, the configuration of the power circuit comprises selecting a portion of the plurality of digital voltage dividers for use in the conversion. In additional IHS embodiments, the input generated by the operation of the power circuit comprises greater than 200 watts of power. In additional IHS embodiments, execution of the instructions by the logic unit of the embedded controller further causes the embedded controller to: negotiate a USB-PD transmission by the wireless power transmission unit; configure a bypass of the power circuit of the IHS; and route the USB-PD transmission to a battery charger of the IHS.

In various additional embodiments, methods are provided for powering an Information Handling System (IHS). The method may include: detecting a coupling a wireless power transmission unit with a wireless power reception unit of the IHS, wherein the wireless power transmission unit supports transmissions comprising a plurality of USB-PD (Universal Serial Bus Power Delivery) transmissions, and further supports a high-power transmission of a voltage greater than voltages of the plurality of USB-PD transmissions; when the wireless charging unit coupling is detected, determine the wireless charging unit supports transmission of the high-power charging transmission; negotiating the high-power transmission by the wireless power transmission unit; and configuring a power circuit of the IHS for converting the negotiated high-power transmission to an input utilized by the IHS.

In additional method embodiments, the high-power transmission comprises a nominal voltage of approximately 54 volts. In additional method embodiments, the high-power transmission comprises a peak voltage of 60 volts. In additional method embodiments, the power circuit comprises a plurality of digital voltage dividers operable for converting the high-power transmission to the input. In additional method embodiments, the configuration of the power circuit comprises selecting a portion of the plurality of digital voltage dividers for use in the conversion. In additional embodiments, methods may further include: negotiating a USB-PD transmission by the wireless power transmission unit; configuring a bypass of the power circuit of the IHS; and routing the USB-PD transmission to a battery charger of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
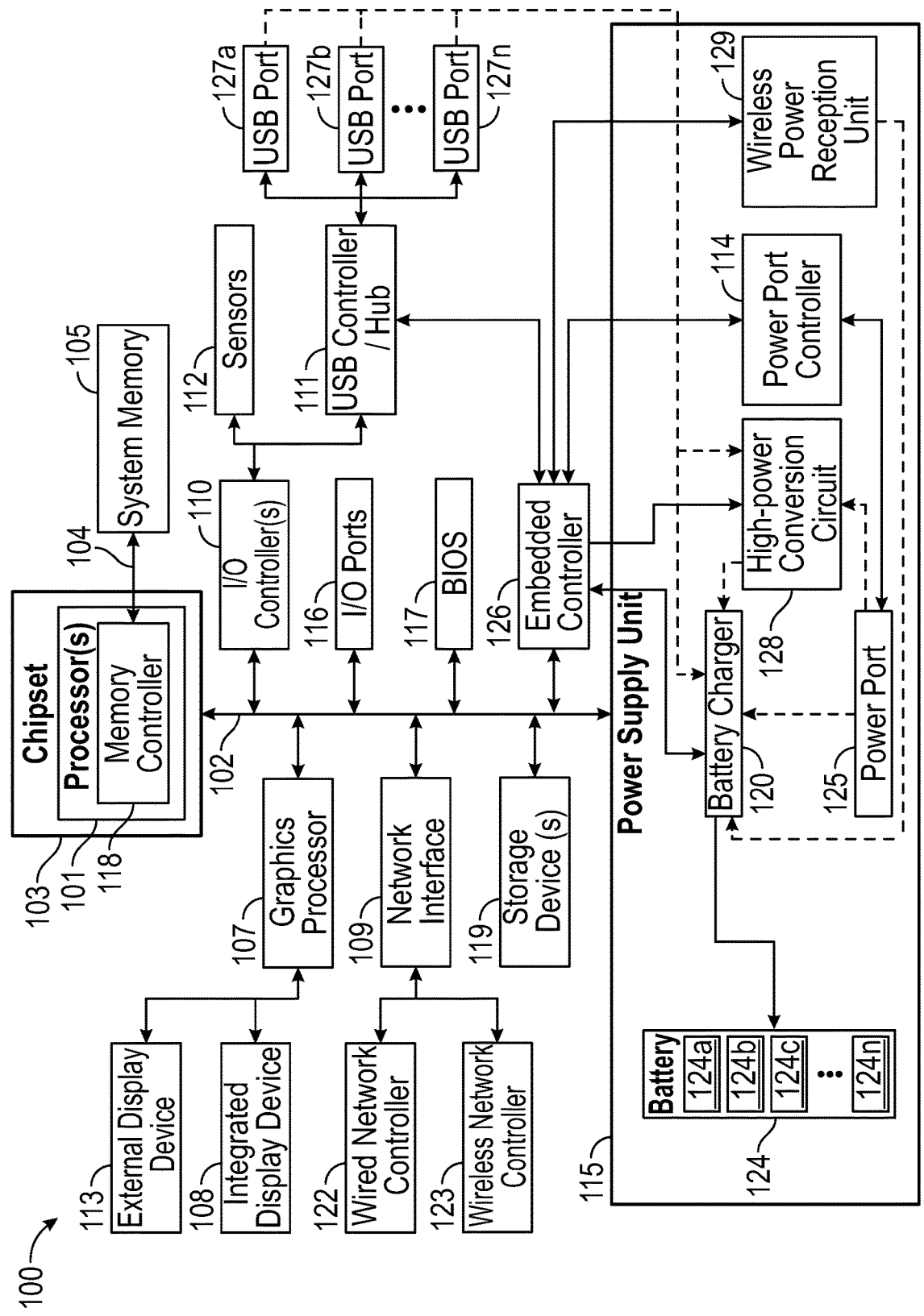
FIG. 1 is a block diagram depicting certain components of an IHS operable according to various embodiments for conversion of power received by multimode wireless transmission and by multimode USB-C power transmissions.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

As described, certain portable IHSs may utilize AC adapters for providing power from an electrical outlet that is converted to a DC output that is used in powering a portable IHS and/or recharging internal batteries of a portable IHS. As IHSs become thinner, and thus more portable, it is preferable that the AC adapters used for charging portable IHSs also remain as thin and as portable as possible. The adoption of thinner charging connectors promotes thin portable IHSs and thin AC adapters. For instance, USB-C connectors may support providing an IHS with charging inputs and may be considerably thinner than USB Type A connectors, as well as being thinner than the cylindrical barrel connectors that are commonly supported by IHS power ports.

Also as described above, an IHS may be provided power via a wireless power coupling between components of a charging pad and components of the IHS. The lack of any mechanical interface for wireless charging allows a charging pad or other type of wireless charging unit to be used in powering a wide variety of wireless IHSs. Users of IHSs supporting wireless charging can be expected to attempt, either purposefully or inadvertently, to charge their wireless IHS using unsupported charging pads. Attempts to utilize an unrecognized wireless charging unit can result in unsupported power transmissions to an IHS that may result in damage. Accordingly, avoiding such damage while supporting high-power wireless power transmissions requires successfully negotiating power transmission levels by a wireless power unit that are supported by the wireless power reception unit of the IHS.

While IHSs become increasingly thinner and more portable, the power requirements for portable IHSs are not necessarily decreasing. As described with regard to FIG. 1, certain portable IHSs such as laptops may include multi-core processors, a separate graphics processor, significant amounts of memory, persistent storage drives, specialized microcontrollers and one or more integrated displays. Such high-performance portable IHSs may have significant power demands, in some cases greater than 200 watts. In some instances, portable IHSs may have power demands as high as 250 watts. In many instances, portable IHSs may also be expected to serve as a source of power for external devices coupled to the portable IHS. USB-C power adapters utilize thin cabling that limits power transmissions to 5 amps. Since charging voltages specified by USB-PD protocols are limited to 20 volts, existing USB-C power adapters are limited to providing less than 100 watts of power. Wireless power transfers are not limited by the transmission capacities of cabling, but are nonetheless limited by the power delivery capabilities of the wireless charging unit and by the power conversion capabilities of the IHS. In many instances, wireless charging power transfers do not exceed 20 volts since transfers of greater voltages generate significant levels of heat in the IHS conversion circuitry and/or require larger wireless transmission and reception components that can support higher currents.

In order to be classified as NEC (National Electrical Code) Class 2 or Class 3 power supply units, the output of a power supply must be less than 60 volts. Power supplies with voltage outputs greater than 60 volts may be considered to pose a risk of fire or electric shock and may thus be subject to additional circuit protection requirements. Accordingly, embodiments provide support for AC power adapters and wireless transmission units capable of transmitting output voltages of up to 60 volts that may be used to provide upwards of 200 watts of power to IHSs. As described in additional detail below, embodiments may support wireless transmission of supply voltages of up to 60 volts via use of a multimode AC adapter and a high-power conversion circuit.

An IHS according to embodiments includes a high-power conversion circuit used to convert the power supply, received either wirelessly or via a USB-C coupling, to high-power supplies providing greater than 200 watts of power. Power adapters according to embodiments that support transmission of supply voltages up to 60 volts may be USB-C power adapters that utilize the various pins supported by USB-C connectors to support use of data lines and power supply lines between an IHS and a coupled device. Using these USB-C couplings, the power supply lines may support bi-directional charge transfer where the IHS may either be supplied with power or may serve as a source of power. Using the high-power conversion circuit of IHS embodiments, multimode USB-C power adapter may support transmission of voltages of up to 60 volts, as well as transmission of supply voltages supported by the USB-PD specifications (e.g., 5V, 9V, 15V, 20V), thus providing multimode charging outputs. As described in additional detail below, this same high-power conversion circuit may be utilized by the IHS to efficiently convert wireless power transmissions of up to 60 volts to a voltage (e.g., 18-20 volts) suitable for powering operations of the IHS. In some embodiments, this same high-power conversion circuit may be utilized by a multimode AC adapter and/or by a multimode wireless power transfer unit.

FIG. 1 is a block diagram illustrating certain components of an IHS 100 configured according to certain embodiments for conversion of power received by wireless transmission and/or by a multimode USB-C power adapter. In some embodiments, a multimode wireless power transfer unit may support power modes that provide IHS 100 with high-power inputs, such as inputs exceeding 200 watts that are delivered at 60 volts or less, while also supporting USB-PD power transmission modes. In various embodiments, IHS 100 may include an embedded controller 126 that includes logic that executes program instructions, in conjunction with operations by components of power supply unit 115 and USB controller 111, to perform the operations disclosed herein for configuring the conversion of power received by a multimode USB-C AC adapter or by a multimode wireless power transmission unit. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices 111 and sensors 112. For instance, I/O controller 110 may provide access to one or more user I/O devices 110 such as a keyboard, mouse, touchpad, touchscreen, microphone, speakers, camera and other input and output devices that may be coupled to IHS 100. Each of the supported user I/O devices 111 may interface with the I/O controller 110 through wired or wireless connections. In certain embodiments, sensors 112 accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127*a-n*. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127*a-n* supported by IHS 100.

In some embodiments, USB controller 111 may control the distribution of both data and power transmitted via USB ports 127*a-n*. For instance, USB controller 111 may support data communications with USB devices that are coupled to the USB ports 127*a-n* according to data communication protocols set forth by USB standards. The power transmissions supported by USB controller 111 may include incoming charging inputs received via USB ports 127*a-n*, as well as outgoing power outputs that are transmitted from IHS 100 to USB devices that are coupled to USB ports 127*a-n*. In some embodiments, USB controller 111 may interoperate with embedded controller 126 in routing power inputs received via USB ports 127*a-n* to a battery charger 120 supported by the power supply unit 115 of IHS 100. USB controller 111 may negotiate the transmission of power inputs received via USB ports 127*a-n*, where these power inputs may include USB-PD power inputs as well as high-power inputs of up to 60 volts. Using a high-power conversion circuit 126, the power supply unit 115 may convert received supply inputs of up to 60 volts to voltages (e.g., 18-20 volts) suitable for use in rapidly charging the internal batteries 124 of IHS 100, supporting high-power operations of IHS 100, and/or serving as a power source for external devices that are coupled to a USB port 127*a-n* of IHS 100. In some scenarios, the operation of power conversion circuit 112 may support power transfers that support high-power operations of the IHS, while still providing sufficient power to also continue in providing power to external devices coupled to a USB port 127*an-n* of IHS 100. As described in additional detail below, in scenarios where a multimode source according to embodiments is detected as being coupled to one of the USB ports 127*a-n*, USB controller 111 may receive inputs from embedded controller 126 that direct power received at USB ports 127*a-n* to be routed to a high-power conversion circuit 128.

Other components of IHS 100 may include one or more I/O ports 116 that support removeable couplings with various types of peripheral external devices. I/O ports 116 may include various types of ports and couplings that support connections with external devices and systems, either through temporary couplings via ports, such as HDMI ports, accessible to a user via the enclosure of the IHS 100, or through more permanent couplings via expansion slots provided via the motherboard or via an expansion card of IHS 100, such as PCIe slots.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n, wireless power reception unit 129 and/or via a power port 125 supported by the power supply unit 115. In addition, operations of embedded controller 126 may provide battery status information, such as the current charge level of the cells 124a-n of battery 124.

In management of operating modes of IHS 100, embedded controller 126 may implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together to a closed position. In response to lid position sensor detecting latching of the lid of IHS 100, embedded controller 126 may initiate operations for shutting down IHS 100 or placing IHS 100 in a low-power mode.

In this manner, IHS 100 may support the use of various power modes. In some embodiments, the power modes of IHS 100 may be implemented through operations of the embedded controller 126 and power supply unit 115. In various embodiments, a mobile IHS 100 may support various low power modes in order to reduce power consumption and/or conserve power stored in battery 124 when mobile IHS 100 is not actively in use. The power modes may include a fully on state in which all, or substantially all, available components of mobile IHS 100 may be fully powered and operational. In a fully off power mode, processor(s) 101 may powered off, any integrated storage devices 119 may be powered off, and/or integrated displays 108 may be powered off. In an intermediate low-power mode, various components of mobile IHS 100 may be powered down, but mobile IHS 100 remains ready for near-immediate use. In a standby power mode, which may be referred to as a sleep state or hibernation state, state information may be stored to storage devices 119 and all but a selected set of components and low-power functions of mobile IHS 100, such as standby functions supported by embedded controller 126, are shut down.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a DC supply of power. The DC power input received at power port 125 may be utilized by a battery charger 120 for recharging one or more internal batteries 124 of IHS 100. As illustrated, batteries 124 utilized by IHS 100 may include one or more cells 124a-n that may connected in series or in parallel. Power supply unit 115 may support various modes for charging the cells 124a-n of battery system 124 based on the power supply available to IHS 100 and the charge levels of battery 124.

In certain embodiments, power supply unit 115 of IHS 100 may include a power port controller 114 that is operable for configuring operations by power port 125. In certain embodiments, power port controller 114 may be an embedded controller that is a motherboard component of IHS 100, a function supported by a power supply unit 115 embedded controller, or a function supported by a system-on-chip implemented by processors 101. In some embodiments, power port controller 114 may exchange communications, such as PSID (Power Supply Identifier) signals, with a multimode power source coupled to power port 125 in identifying the adapter and negotiating its output. As described in additional detail regard to the below embodiments, in scenarios where a high-power supply is detected as being coupled to power port 125, power port controller 114 may receive inputs from embedded controller 126 directing the power supply input received at power port 125 to be routed to a high-power conversion circuit 128.

As illustrated, power supply unit 115 of IHS 100 may include a wireless power reception unit 129 that may receive wireless power transmissions from a charging pad, such as via power transmitted via an inductive coupling between the wireless power reception unit and a compatible wireless power transmission unit. In various embodiments, wireless power reception unit 129 may utilize different power transfer technologies in addition to or instead of inductive coupling, such as resonant inductive coupling, capacitive coupling and beamed power transfer, such as laser or microwave transfer. As described in additional detail with regard to FIG. 3, upon detecting the coupling of a wireless power source by the wireless power reception unit 129 of the IHS, embedded controller 126 may route received wireless power to the high-power conversion circuit 128, thus providing a capability for wirelessly transmitting up to 60 volts of power to IHS 100 where it is efficiently converted to a voltage (e.g., 18-20 volts) suitable for use in charging the battery system 124 of the IHS 100.

Using the high-power conversion circuit 128, the power supply unit 115 converts received supply inputs of up to 60 volts to a voltage (e.g., 18-20 volts) suitable for use in charging the internal battery system 124 of IHS 100, directly powering the operations of IHS 100 and/or providing power to external devices coupled to IHS 100. In scenarios where the supply voltage is being provided via a USB-C port 127a-n, USB-C power cords may be limited to transmitting 5 amps of current. In such instances, the high-power conversion circuit 128 may convert received 5-amp supply inputs of up to 60 volts to a power supply of approximately 18 volts/12 amps that is usable by IHS 100. In this manner, high power conversion circuit 128 may support use of USB-C couplings for transmission of power at voltages up to 60 volts and conversion of the supply voltage in a manner that supports power requirements above 200 watts, in some cases above 250 watts. In the same manner, high-power conversion circuit 128 may also be used to efficiently convert supply inputs of up to 60 volts that are received by a wireless power reception unit 129 to a voltage suitable for us by the IHS 100 such that that the wireless power delivery results in greater than 200 watts of available power.

In some embodiments, high-power conversion circuit 128 may be implemented using a buck-boost converter that includes a set of cascading digital voltage dividers (i.e., digital potentiometers) that may be driven at high frequencies (e.g., 10 MHz) in order to support high-efficiency voltage conversion. In some embodiments, the digital voltage dividers of the high-power conversion circuit 128 may be configured for being driven at high frequencies via the use of switching elements that utilize a GaAs semiconductor, as the inventors have recognized this configuration provides efficiency improvements over existing power supply techniques used to deliver power in the range of 60 volts. Existing buck converters that are utilized to support IHS power supplies operate using analog, capacitive voltage dividers. When converting a 54-volt input to an 18-volt output using such existing capacitive buck converters, conversion efficiencies are typically around 88%, thus generating up to 25 watts of heat. By utilizing digital voltage dividers driven at high frequencies, up to 98% conversion efficiencies may be obtained. Through such high efficiency conversion, heat dissipation remains manageable at approximately 5 watts. In some embodiments, high-power conversion circuit 128 may be a buck-boost converter, where the buck operations utilize digital voltage dividers and boost operations may be implemented using capacitive or inductive elements. As described in additional detail with regard to FIG. 2B, in embodiments where high-power conversion circuit 128 includes buck and boost capabilities, a multimode AC adapter according to embodiments may include the same high-power conversion circuit 128 that utilizes the converter's boost capabilities to efficiently generate outputs of up to 60 volts for transmission to IHS 100, where the circuit's buck capabilities are used to efficiently convert the supply to a voltage suitable for use by the IHS. As described in additional detail with regard to FIG. 3, a multimode wireless transmission unit according to embodiments may also include the same high-power conversion circuit 128 that utilizes the converter's boost capabilities to efficiently generate outputs of up to 60 volts for transmission to IHS 100. In some embodiments, the embedded controller of an IHS may negotiate a lower supply voltage (e.g., 36 volts) with a multimode AC adapter or a multimode wireless transfer unit, thus requiring use of only a single digital voltage divider by the high-power conversion circuit to reach an 18-volt output, while generating even less heat.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
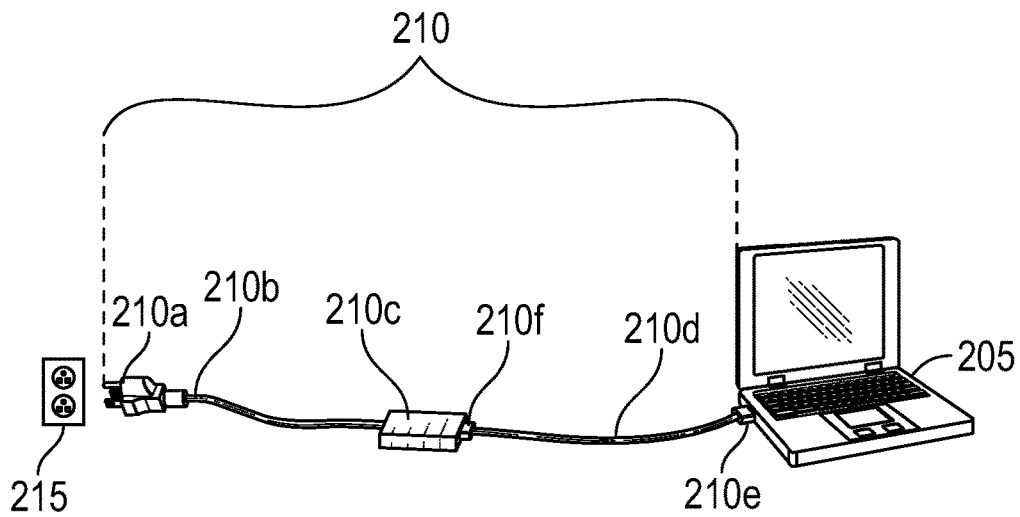
FIG. 2A is a diagram depicting certain components of a multimode USB-C power supply system, according to various embodiments, that includes an AC adapter that is coupled to an IHS that is a laptop computer.

FIG. 2A is a diagram depicting components of multimode power system according to various embodiments, where that system includes a multimode AC power adapter 210 coupled to an IHS that is a laptop computer 205. Multimode AC adapter 210 may be capable of providing supply voltages to laptop 205 that may include standard USB-PD output voltages, as well as high-power output voltages up to 60 volts. As described in additional detail with regard to FIG. 3, in some embodiments, rather than powering IHS 205 directly, multimode AC power adapter 210 may be utilized to power a wireless power transmission unit that may transmit power to the IHS, where the wireless power transmission unit may negotiate with AC adapter 210 on behalf of IHS 205 in order to determine a power output to be provided by the multimode AC adapter 210.

Whether provided via a wireless power transmission unit or via a direct coupling with an IHS, power provided by multimode AC power adapter 210 may be used to charge the internal batteries of laptop computer 205. Via these supported power supply modes, multimode AC power adapter 210 may be used to charge the batteries of various types of portable IHSs, such as tablets, 2-1 laptops, convertible laptops, smartphones, smart watches, cameras, toys, gaming accessories, and various other types of devices. Embodiments may be implemented using all varieties of IHSs that operate on DC power supplied using rechargeable batteries and that charge these batteries using DC power converted by an AC adapter 210.

A multimode AC power adapter 210 according to embodiments may include several connected components that operate to draw AC power from an electrical outlet 215 and convert the AC power to a DC output for delivery to an IHS, such as the laptop 205 of FIG. 2A, either directly or via a wireless power transmission unit. One end of the AC power adapter 210 includes an AC plug 210a that includes prongs that may be inserted into slots provided by an AC electrical outlet 215. Many different types of AC plugs 210a are utilized throughout the world, with different plugs from different regions utilizing different numbers, shapes and orientations of the prongs that conform to the electrical outlets used in a region. In North America, most general-purpose electrical outlets deliver 120 V of AC at a frequency of 60 hertz.

As illustrated, an AC electrical cord 210b of multimode AC adapter 210 connects AC plug 210a to multimode converter 210c. In many embodiments, AC electrical cord 210b may be removeable from converter 210c. Embodiments may also include AC electrical cords 210b that are fixed to converter 210c. A function of a multimode of converter 210c is to convert the AC received from power cord 210b to a DC output that can be used to power IHSs, either directly or via a wireless power transmission. In certain instances, converter 210c may be referred to as a power brick. In some embodiments, multimode converter 210c may generate outputs in accordance with USB-PD protocols and may also generate high-power outputs that exceed the maximum 20 volts outputs of USB-PD, such as outputs up to 60 volts. In this manner, multimode converter 210c may support multiple output supply modes, thus providing support for providing power to a range of IHSs, including IHSs such as high-power laptop computers. In some scenarios, the ability to efficiently support high-power supply modes allows high-power operations of the IHS 205 to be supported while still providing sufficient additional power to serve as a power source for devices coupled to IHS 205.

In some embodiments, the multimode AC power adapter may support a nominal high-power transmission of 54 volts, thus allowing for 10 percent fluctuations in the actual charging output while still maintaining outputs below 60 volts. Typical embodiments may support other nominal supply voltages between 50 volts and 60 volts depending on the anticipated fluctuations in the actual charging input. Many embodiments may support nominal supply voltages ranging from 54 volts to 56 volts. Some embodiments may be configured to support supply voltages significantly below 50 volts.

In supporting of these multiple output supply modes, converter 210c may support identification of the multimode AC adapter 210 to the coupled IHS and/or to a coupled wireless power transmission unit, where this identification information may be utilized in configuring the DC power output generated by converter 210c and transmitted to IHS 205 and/or a wireless power transmission unit. Converter 210c may also support capabilities for negotiating with IHS 205 or with a wireless power transmission unit to determine the parameters of the DC output supply voltage generated by converter 210c. The DC output generated by converter 210c is provided to laptop 205 or a wireless power transmission unit via a DC power cord 210d that supplies the DC output via a connector that is received by a port of the laptop or by a port of the wireless power transmission unit.

DC cord 210d includes a DC plug 210f that may be received by a port of converter 210c. In the illustrated embodiment, the DC plug 210f is a USB-C connector that is received by a USB-C port of converter 210c. The DC plug 210e on the opposite end of DC cord 210d may be an identical to DC plug 210f and may thus also be a USB-C connector that is received by a USB-C port 205b of IHS 205 or a USB-C port of a wireless power transmission unit. In such embodiments, DC cord 210d may be a reversible USB-C cable with USB-C connectors on each end. In some embodiments, multimode AC adapter 210 may also support use of a DC cord 210d that, instead of USB-C connectors, includes a barrel connector for DC plug 210f that is received by a corresponding power port of converter 210c and also includes a barrel connector for DC plug 210e that is received by a power port 205a of IHS 205 and/or a port of a wireless power transmission unit. In some embodiments, a DC cord 210d utilizing barrel connector DC plugs 210e and 210f may be reversible. In some embodiments, converter 210c may include both one or more USB-C ports and a barrel connector power port, thus supporting two types of removeable DC cords 210d. In some embodiments, converter 210c may support a single fixed DC cord 210d that may be a USB-C cord or a DC power code utilizing a barrel connector. As described, embodiments may support the transmission of power at voltages up to 60 volts, while adhering to the 5 amp limitation on some USB-C cords 210d. The high-power conversion circuit of IHS 205 may then be used to efficiently convert the transmitted power to a usable voltage in a manner that may provide over 200 watts of power to IHS 205. Through use of the high-power conversion circuit, high-power IHSs may be supported using thin USB-C cords 210d, thus promoting the use of thinner and more portable multimode AC adapters 210 for use by a large range of IHSs, including IHSs capable of utilizing more than 200 watts of power, and in some cases up to 250 watts of power. In addition, the efficient conversion provided by the high-power conversion circuit supports the use of thinner barrel connectors and thinner cabling for DC cords that are received by the power port of the IHS. As described, IHSs continue to get thinner and more portable. In some IHSs, the IHS power port that receives a cylindrical barrel connector is one of the thickest components of the IHS. By supporting thinner barrel connectors, the diameter of the power ports supported IHSs can also be reduced, thus providing an opportunity to make IHSs still thinner.

Figure 2B:
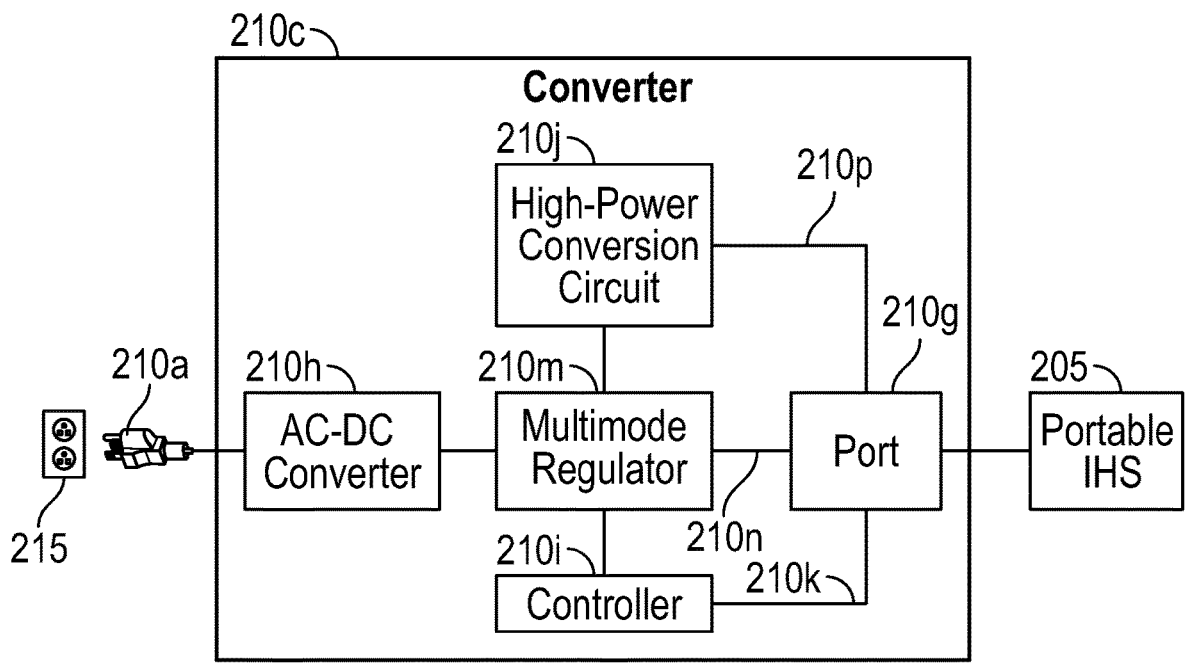
FIG. 2B is a diagram depicting certain additional components of a multimode power supply system, according to various embodiments, that includes an AC adapter that is coupled to an IHS.

FIG. 2B is a diagram depicting additional components of a multimode power system according to various embodiments, where the system includes a multimode converter 210c of AC power adapter coupled to an IHS 205. In FIG. 2B, certain of the internal components of a multimode converter 2101c, according to some embodiments, are illustrated. Multimode converter 210c receives AC power drawn from AC outlet 215 and provides portable IHS 205 with a supply of DC power, either directly or via a wireless power transmission unit. Multimode converter 210c may utilize an AC/DC converter 210h that receives the AC power and generates a supply of DC power that may be supplied to a multimode regulator 210m. Based on configurations provided by a controller 210i of the converter 210c, multimode regulator 210m may supply a regulated supply of DC power to a power port 210g of the converter or to a high-power conversion circuit 210j.

As described, in some embodiments, converter 210c may be coupled to mobile IHS 205 via a USB-C cable or a wireless power transmission unit. Other embodiments may utilize a DC cable that couples to IHS 205 via a barrel connector coupling. The DC cabling, whether USB-C or a DC barrel connector cabling, may be received by a port 210g of the converter. The DC cable may be removable from port 210g, or may be fixed to port 210g. In some embodiments, converter 210c may include separate USB-C and DC barrel connector ports that may operate in the manner described for port 210g. Upon the AC converter being coupled to IHS 205 or a wireless power transmission unit, converter 210c may initiate handshake procedures for identifying the capabilities of the AC adapter and in negotiating an output of converter 210c.

In USB-C embodiments, controller 210i of converter 210c and a USB controller of IHS 205, such as USB controller 111 of FIG. 1, may initiate USB-PD communications via a data pin of the USB-C coupling in determining the USB-PD outputs supported by converter 210c and in negotiating a USB-PD output (e.g., 5V, 9V, 15V, 20V) to be supplied to IHS 205 by converter 210c. Additionally, embodiments may supplement these USB-PD communications with additional communications conducted between controller 210i and the USB controller of IHS 205 via a data pin of the USB-C coupling. These additional communications may identify converter 210c as being a multimode converter capable of providing high-power outputs of up to 60 volts. The additional communications may also support negotiating a particular supply output by converter 210c. In some embodiments, these additional communications for supporting high-power operations may be PSID signals that are transmitted along data pins of the USB-C coupling. In embodiments where converter 210c provides power to IHS 205 via a wireless power transmission unit, the wireless power transmission unit may support routing of USB data pathway communications between the IHS and the multimode AC adapter.

In embodiments that utilize a DC coupling with a barrel connector, a similar negotiation may be conducted between controller 210i of converter 210c and a power port controller of IHS 205, such as power port controller 114 of FIG. 1. In such embodiments, controller 210i and the power port controller of IHS 205 may exchange PSID messages via a data line included in the DC cabling. The exchanged PSID messages may identify converter 210c as a multimode converter capable of generating high-power outputs, as well as specifying ordinary power outputs that are supported by the converter. Additional PSID messages may be exchanged that negotiate a supply output by converter 210c. In embodiments where converter 210c provides power to IHS 205 via a wireless power transmission unit, the wireless power transmission unit may support routing of PSID data pathway communications between the IHS and the multimode AC adapter.

As indicated in FIG. 2B, controller 210i may utilize a data pathway 210k in receiving data line communications received by port 210g, whether the port is a USB-C port that transmits USB data pin communications or whether port 210g is a DC port relaying on PSID communications. Based on such data communications, controller 210i may specify the capabilities of converter 210c to IHS 205 or to a wireless power transmission unit and may negotiate the output to be supplied by converter 210c. Once the supply output of converter 210c has been negotiated, controller 210i may configure multimode regulator 210m for generating the negotiated output. In some instances, port 210g may be a USB-C power cord and controller 210i may negotiate a USB-PD output by converter 210c. In such instances, controller 210i may configure multimode regulator 210m to deliver a USB-PD output, via power pathway 210n, to port 210g. In other instances, controller 210i may negotiate a high-power output by converter 210c. In such instances, controller 210i may configure multimode regulator 210m to route its output to high-power conversion circuit 210j for generating a high-power output of a voltage up to 60 volts and delivering greater than 200 watts of power.

As described with regard to FIG. 1, a high-power conversion circuit 128 may be utilized by an IHS 100 to efficiently convert high-power supply inputs of up to 60 volts to a voltage (e.g., 18-20 volts) suitable of use by IHS 100. In some embodiments, the high-power conversion circuit 128 of IHS 100 may be a buck-boost converter that may include capacitive and/or inductive boost capabilities. In some embodiments, the boost capabilities of this same buck-boost, high-power conversion circuit 210j may be utilized by multimode AC converter 210c in efficiently generating high-power supply outputs. In such embodiments, the same conversion circuit may be utilized by both the power supply unit of IHS 205 and the AC converter 210c. In some embodiments, boost capabilities of a high-power conversion circuit 210j may be implemented using capacitive elements, such as switched capacitors that may be driven at high frequencies in order to provide high-efficiency conversions with as little as 2% loss. Such capacitive conversion elements provide efficient conversions but are capable of supporting only a limited number of conversion ratios, thus limiting the use of capacitive elements to use in converting a certain set of input and output voltages. Some embodiments may additionally or alternatively implement boost capabilities using inductive elements, thus operating at reduced efficiencies, but providing the ability to support a wider range or conversions. In some embodiments, the high-power conversion circuit 210j included in multimode AC converter 210c may include only boost converter capabilities, and may thus provide complimentary capabilities to a buck converter or buck-boost high-power conversion circuit 128 in the coupled IHS 205.

Figure 3:
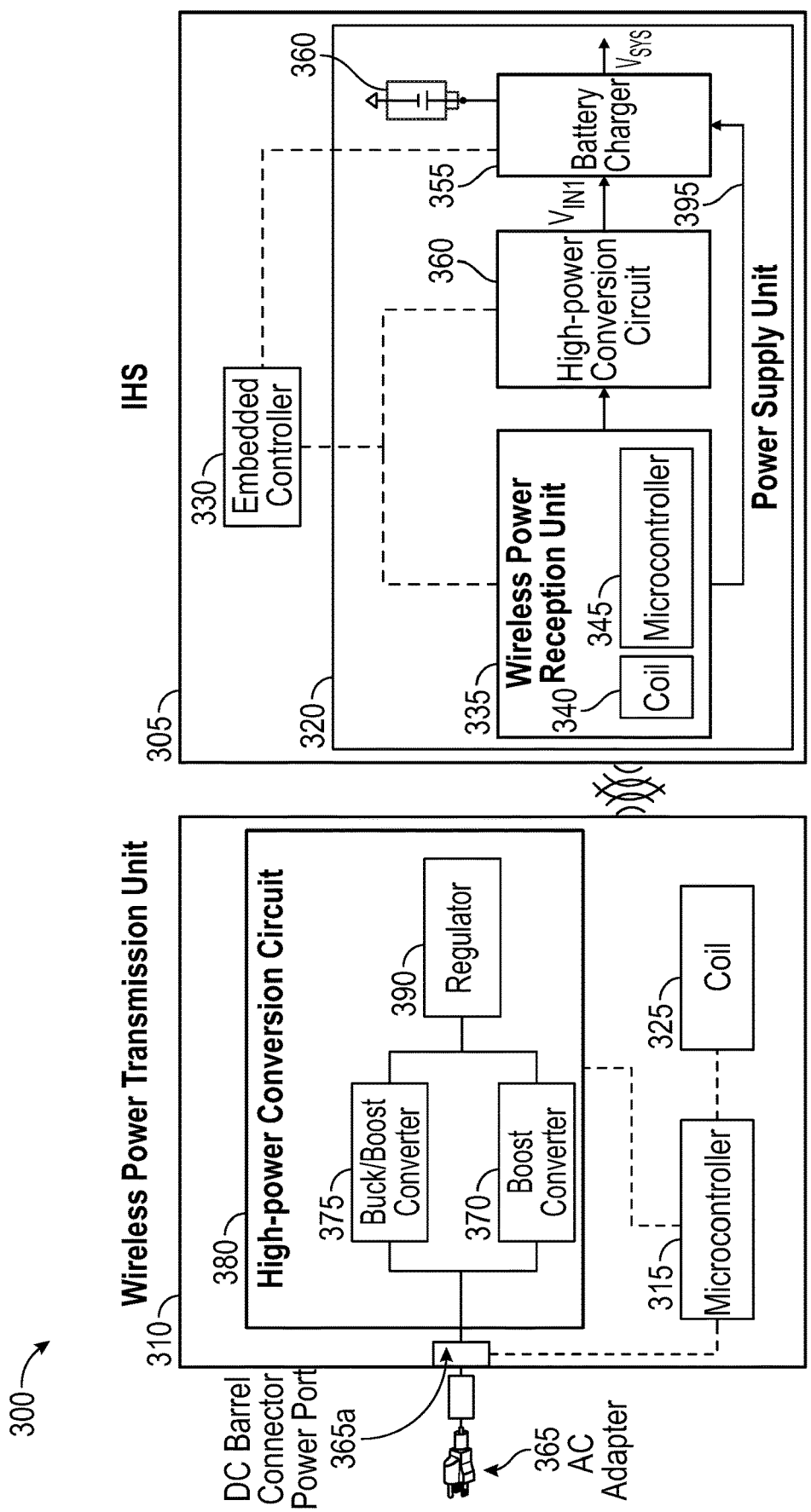
FIG. 3 is a block a diagram depicting certain components of a wireless charging system according to various embodiments.

FIG. 3 is a block a diagram depicting certain components of a multimode wireless power system 300 according to various embodiments. The multimode wireless power system 300 provides power to an IHS 305 that includes a rechargeable battery system 360 and a battery charging system 355. The IHS 305 may include a wireless power reception unit 335 that receives a transfer of power from wireless power transmission unit 310, such as a charging pad. The wireless power transmission unit 310 may operate via an inductive coupling between a coil element 325 of the wireless power transmission unit 310 and a corresponding coil element 340 of the wireless power reception unit 335. The voltage generated by the wireless power reception unit 335 may then be used by the battery charger 355 to provide a system voltage (Vsys) and/or charge battery 360.

As described with regard to FIG. 1, an IHS 305 according to embodiments may include a power supply unit 320 that receives power from one or more power sources that may include an AC adapter coupled to a power port of IHS 305, a multimode USB-C adapter coupled to a USB-C port of IHS 305 or a multimode wireless power transmission unit 310, such as a charging pad. The power supplies received via each of these sources may provide inputs of up to 60 volts, which can be converted, using a high-power conversion circuit 360, to a voltage suitable for use by battery charger 355, directly powering operations by the IHS 305 and/or providing power to external devices coupled to IHS 305, such as an 18 volt/12 amp supply. As described, a high-power conversion circuit 360 may provide efficient conversion of voltages of up to 60 volts in a manner that dissipates manageable amounts of heat. By providing efficient conversion of such supply voltages, the power output of the wireless power transmission unit 310 may be reduced while maintaining the ability for IHS 305 to generate a suitable charging voltage (i.e., 18-20 volts). By reducing the wireless power that must be generated, lower currents may be used by the coil 325 of the wireless power transmission unit 310, thus providing an opportunity to reduce the heat generated by the operation of coil 325 and also to reduce the weight of coil 325.

Multimode wireless power transmission unit 360 may include an embedded controller 315 that detects the coupling of an AC adapter 365 to power port 365a. Once an AC adapter 365 is detected as being coupled to port 365a, embedded controller 315 may identify the detected AC adapter. In some embodiments, embedded controller 315 may identify AC adapter 365 via PSID signals that are communicated by a logic unit of the AC adapter and transmitted via a data path supported by AC adapter 365. The PSID signal received by embedded controller 315 may specify the type (e.g., model) of the AC adapter 365 and/or may specify power output characteristics of the AC adapter 365.

As illustrated in FIG. 3, power received at power port 365a is routed to a high-power conversion circuit 380 that may include two power pathways. In order to determine the appropriate routing for received power, embedded controller 315 may communicate with mobile IHS 305 in order to determine the power supply inputs to be provided by wireless power transmission unit 310 to IHS 305. As described with regard to the embodiment of FIG. 1, a mobile IHS 100 according to embodiments may utilize an embedded controller 126 that may be used in configuring aspects of various power and charging modes of a mobile IHS 100. Accordingly, in some embodiments, embedded controller 315 of wireless power transmission unit 310 may communicate with an embedded controller 330 of mobile IHS 305 via signaling supported by the wireless couplings between coil 325 and coil 340 in order to determine the power to be supplied by the wireless power transmission unit 310. These communications between embedded controller 315 of the wireless power transmission unit and the embedded controller 330 of the IHS 305 may serve to identify the wireless power transmission unit 310 as a multimode power source capable of providing USB-PD power transmissions and high-power transmissions.

Based on the communications with IHS 305 that determine the supply voltage to be provided by the multimode wireless power transmission unit 310, embedded controller 315 may configure the power supply input received at power port 365a of wireless power transmission unit 310 to be routed to an appropriate power pathway of the high-power conversion circuit 380. In some scenarios, the embedded controller 315 may receive a request from IHS 305 for a USB-PD power transmission (e.g., 5V, 9V, 15V, 20V). In other scenarios, embedded controller 315 may instead receive a request from IHS 305 for a high-power transmission of up to 60 volts. As described with regard to the high-power conversion circuit of the IHS of FIG. 1 and also with regard to multimode AC adapters of FIGS. 2A and 2B, a high-power conversion circuit according to embodiments may include a buck-boost converter, where the buck operations may utilize digital voltage dividers and boost operations may be implemented using capacitive or inductive elements. In some embodiments, a wireless power transmission unit 310 may utilize the same high-power conversion circuit 380 as the high-power conversion circuit 360 of IHS 305, and as a multimode AC adapter that may instead be used in powering IHS 305.

In the embodiment of FIG. 3, the high-power conversion circuit 380 includes both buck and boost capabilities. In particular, the high-power conversion circuit 380 includes a buck/boost circuit that may be used to provide power to external devices coupled I/O ports of the wireless power transmission unit 310. As illustrated, the high-power conversion circuit 380 also includes boost capabilities that may be used in supporting high-power transmissions to IHS 305. In scenarios where communications from the mobile IHS 305 request a USB-PD power transmission from the wireless power transmission unit 310, the embedded controller 315 configures the high-power conversion circuit 380 for use of the buck/boost capabilities 375 to generate USB-PD outputs that are regulated 390 and transmitted via the wireless power coupling between coil 325 of the wireless power transmission unit 310 and coil 340 of the IHS 305. The received wireless power transmission is converted to a DC voltage by the wireless power reception unit 335. The microcontroller 315 may configure power transmissions that result in the requested USB-PD output upon conversion of the wireless power transmission by the wireless power reception unit 335. Upon receptor of the USB-PD transmission, the high-power conversion circuit 360 of the IHS 305 is bypassed 395 and the USB-PD supply voltage is directed to battery charging system 355.

In scenarios where the mobile IHS 305 requests a high-power transmission, the boost converter 370 capabilities of the high-power conversion circuit 380 may be engaged by the embedded controller 315 in order to provide a regulated power transmission of up to 60 volts via the wireless coupling. The received wireless power transmission is converted to a DC voltage by the wireless power reception unit 335 and routed to the high-power conversion circuit 360 for conversion to a voltage (e.g., 18-20 volts) suitable for use by IHS 305. In providing high-power transmissions, the high-power conversion circuit 380 may concurrently utilize buck/boost converter 375 capabilities for providing power to external devices coupled to I/O ports of the wireless power transmission unit 310.

In some instances, the wireless power coupling of the IHS 305 to the wireless power transmission unit 310 may expose the IHS 305 to certain vulnerabilities of the charging pad, such as in instances where an attempt is made to charge an IHS via an unrecognized, public charging pad. Accordingly, some embodiments may authenticate the wireless power transmission unit 310 to ensure it is compatible and uncompromised. Wireless power transmission authentication procedures may be implemented by an embedded controller 330 of IHS 305, such as embedded controller 126 of FIG. 1.

In the embodiment of FIG. 3, the wireless power transmission unit 310 receives power via a barrel connector AC adapter that may provide over 300 watts of power. Other wireless power transmission unit embodiments may alternatively or additionally receive power inputs from multimode USB-C adapters, such as described with regard to FIGS. 2A and 2B. Accordingly, some multimode wireless power transmission unit embodiments may include both a DC barrel connector port and a USB-C port and may be configured to receive power via either a barrel connector AC adapter or via a multimode AC adapter. In such embodiments, the multimode wireless power transmission unit may utilize a high-power conversion circuit that includes the capabilities described for the high-power conversion circuit 380 of FIG. 3 and also includes additionally capabilities for routing the power transmissions of a multimode AC adapter directly to IHS 305 via the wireless coupling.

Figure 4:
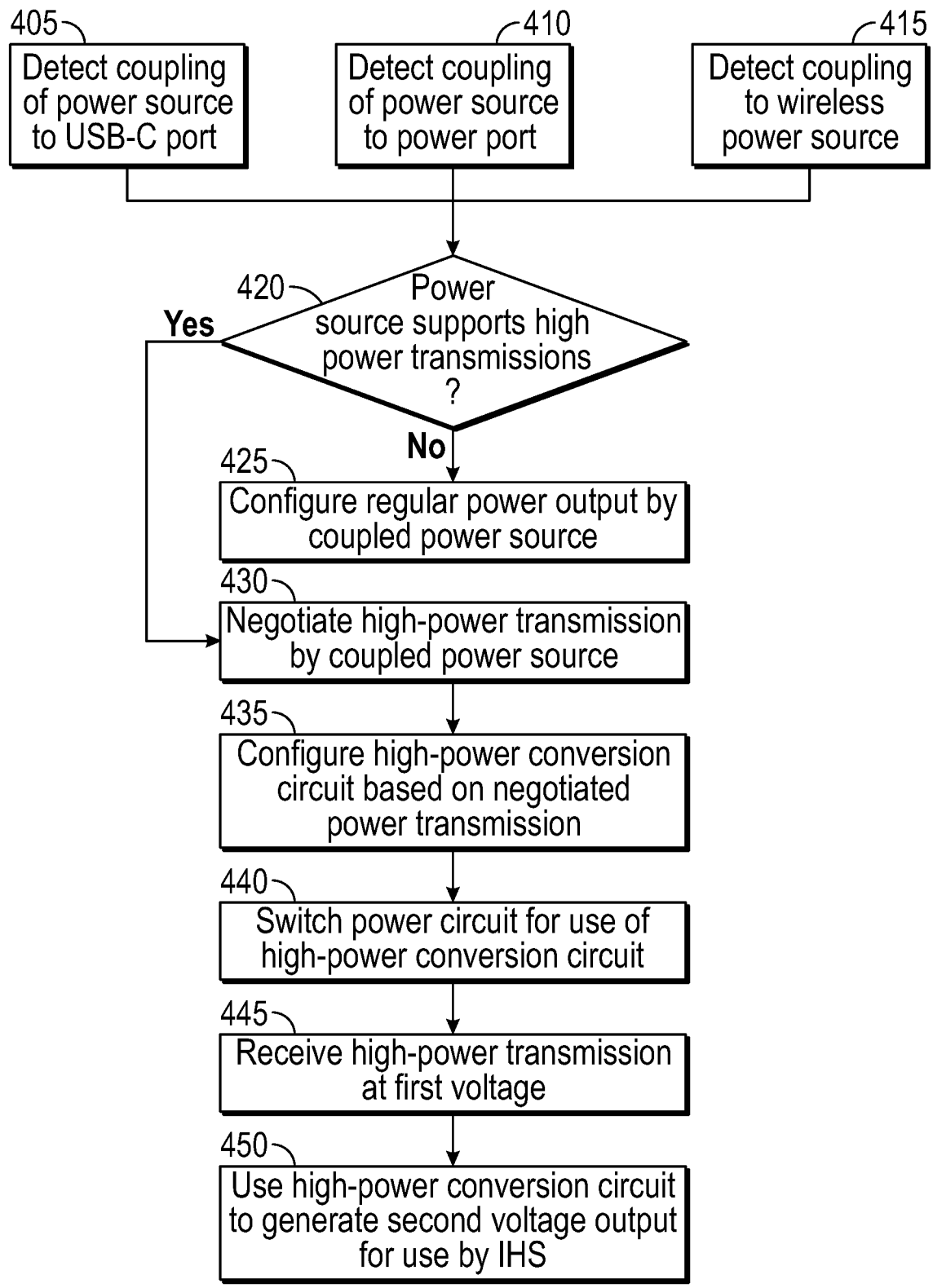
FIG. 4 is a flow chart diagram illustrating certain steps of a process according to various embodiments for conversion of power received by multimode wireless transmission and by multimode USB-C power transmissions.

FIG. 4 is a flow chart diagram illustrating certain steps of a process according to various embodiments for conversion of power received by wireless transmission and by multimode USB-C power transmissions. In some scenarios, embodiments may begin at block 415 with the coupling of a wireless power source to a wireless reception unit of an IHS. As described with regard to FIG. 3, a user may attempt to initiate wireless charging of an IHS via an unrecognized charging pad. Accordingly, in some embodiments, a wireless charging unit and may be interrogated and authenticated as being trustworthy by an IHS prior to initiating any power transfers from the charging unit. Once authenticated, further interrogation of the wireless charging unit may continue in order to determine the power transfer capabilities of the wireless charging unit.

In other scenarios, embodiments may begin at block 405 with the coupling of a power source to a USB-C port of an IHS. As described with regard to FIG. 1, an IHS according to embodiments may include a USB controller that detects the coupling of a device to one or more USB-C ports supported by the IHS. For instance, upon coupling a USB-C connector of a multimode AC adapter, such as multimode AC adapter 210 described with regard to FIGS. 2A and 2B, to a USB-C port of an IHS, an USB controller of the IHS may detect a voltage on one or more power pins of the USB-C port. As illustrated, in other scenarios, embodiments may begin at block 410 with the coupling of a power source to a power port of the IHS. As described regard to FIG. 1, an IHS may also include a power port controller 114 that detects the coupling of a barrel connector to a power port 125 of the IHS.

In response to detecting a coupling of a wireless power source or detecting a coupling of a wired power source to a USB-C port or a power port, at block 420, an IHS according to embodiments may determine whether the power source supports high-power supply outputs. In embodiments where a wireless power source has been detected, the IHS may interrogate the wireless power transmission unit in order to determine its power supply capabilities. Based on this interrogation, the IHS may determine that the wireless power source support high-power inputs, such as described herein, of up to 60 volts.

In other embodiments, the converter portion of AC adapter, such as converter 210c of FIGS. 2A and 2B, may include circuitry and/or logic that detects a voltage being drawn by an IHS via the DC power cord of the adapter. In such embodiments, upon detecting a voltage drawn by the IHS, the AC adapter may be configured to generate a power supply identification (PSID) signal that is transmitted on a data channel supported by the DC cord in use by the AC power adapter. As described, multimode AC adapters according to embodiments may include support for both USB-C and barrel type connectors. Accordingly, the converter of an AC adapter may generate a PSID signal that is transmitted according to protocols supported by the type of DC cord connected to the AC adapter. If a USB-C cord is connected, the converter of the AC adapter may transmit USB-PD communications utilizing data channels supported by the USB-C cord. In such scenarios, the USB controller of the IHS may detect the transmission of such USB-PD signals by a multimode AC adapter. If a barrel connector DC cord is connected, the converter of the AC adapter may transmit the PSI D signal utilizing data channel supported by barrel connector. In such scenarios, the power port controller of the IHS may detect the transmission of such PSID signals. In various embodiments, a multimode AC adapter may specify its high-power transmission capabilities via additional USB-PD or PSID signals transmitted via a data pathway supported by the USB coupling. In similar manner, a wireless power transmission unit may transmit communications via the wireless power coupling or via another wireless connection, such as a BLUETOOTH connection between the IHS and the wireless power transmission unit, that identifies the wireless power transmission unit as a multimode power source.

The identifying information received from the wireless power transmission unit or other power source may be forwarded to an embedded controller, such as embedded controller 126 of the IHS of FIG. 1, that supports certain power mode configurations of the IHS. When the detected power source is a wireless power source, such as a charging pad, handshaking techniques may be utilized by the IHS embedded controller to determine the power deliver capabilities of the wireless power transmission unit. Based on the received handshake information, the embedded controller of the IHS may determine, at block 420, whether the power coupled source supports high-power supply outputs such as described herein. If the received handshake information indicates that the coupled power source does not support high-power supply outputs, at block 425, the embedded controller of the IHS configures the transmission of routine power supply outputs by the power source. In scenarios where power is being received via a multimode USB-C adapter, the embedded controller, in conjunction with the USB controller, may configure the transmission of USB-PD power levels (e.g., 5V, 9V, 12V, 20V) by the USB-C adapter. In scenarios where power is being received via a wireless coupling, the embedded controller may negotiate a USB-PD power delivery or according to another power delivery mode supported by both the wireless power transmission unit and the IHS.

If the coupled power source is determined to support high-power outputs, at block 430, the embedded controller negotiates the parameters of the high-power to be provided by the converter of the coupled power source. When the power source is connected via the power port of an IHS, such negotiations between the embedded controller and converter of the AC adapter may be supported by the power port controller of the IHS. When the power source is connected via a USB-C port of an IHS, such negotiations between the embedded controller and the converter of the AC adapter may be supported by the USB controller of the IHS. When the power source is connected via wireless power coupling, such negotiations may be supported based on communications between the wireless power reception unit of the IHS and the wireless power transmission unit.

As described, in certain embodiments, high-power transmissions approaching 60 volts may be supported. For instance, AC adapters, wireless power transmission units, and IHSs configured according to embodiments may support nominal high-power supply outputs of approximately 54 volts, thus allowing for 10 percent fluctuations in the actual output while still maintaining outputs below 60 volts. Other embodiments may support other nominal supply voltages between 50 volts and 60 volts depending on the anticipated fluctuations in the actual charging input. Typical embodiments may support nominal supply voltages ranging from 54 volts to 56 volts.

Such transmissions of up to 60 volts may support high-power charging, but require conversion to lower voltages, such as approximately 18-20 volts, typically utilized by the power and/or charging circuits of IHSs. Performing such voltage conversions using existing techniques generates prohibitive levels of heat. For instance, existing techniques may utilize a set of capacitive voltage dividers that each generate a successively lower output voltage, but do so while also generating significant levels of heat. Accordingly, as described with regard to the high-power conversion circuit of FIG. 1, embodiments may utilize a set of digital voltage dividers that generate significantly less heat than analog voltage dividers. At block 430, the embedded controller of the IHS may negotiate the high-power output to be provided by an multimode AC adapter or the multimode wireless charging unit based on the characteristics of the digital voltage dividers available for converting the high-power supply voltage to a lower voltage usable by an IHS.

For instance, the embedded controller may negotiate a 54-volt supply an multimode AC adapter or by the =multimode wireless power transmission unit, which may be converted to a 18-volt output using two digital voltage dividers of the high-power conversion circuit. Implementing this particular conversion using existing analog voltage dividers may require three or more analog voltage dividing circuits, thus resulting in conversion efficiencies of approximately 88 percent. Such levels of inefficiency not only result in wasted power, but also may generate up to 25 watts of heat within the IHS conversion circuit. Digital voltage divider conversion may result in efficiencies approaching 98 percent, thus resulting in a loss of approximately 5 watts. In some embodiments, the embedded controller may negotiate a lower supply voltage (e.g., 36 volts) with an AC adapter or wireless power transmission unit, thus requiring use of only a single digital voltage divider by the high-power conversion circuit to reach a 18-20 volt output, while generating even less heat.

Upon negotiating a high-power supply voltage by an AC adapter or wireless power transmission unit, at block 435, the embedded controller may configure the high-power conversion circuit. For instance, the embedded controller may configure the number of digital voltage dividers to be engaged in the high-power conversion circuit. The embedded controller may additionally configure various properties of the digital voltage dividers and of the high-power conversion circuit in order to support certain high-power charging modes. At block 440, the embedded controller may engage a switching mechanism of the power supply unit in order to engage the high-power conversion circuit. Once use of the high-power conversion circuit has been configured, at block 445, the embedded controller may signal an AC adapter or wireless power transmission unit to initiate transmission of the negotiated supply voltage, which is then properly routed to the high-power conversion circuit. In instances where an AC adapter is coupled to the IHS via the power port, the negotiated supply voltage may be routed to the high-power conversion circuit according to configurations of the power port by the power port controller. In instances where an AC adapter is coupled to the IHS via a USB-C port, the negotiated supply voltage may be routed to the high-power conversion circuit according to configurations of the USB-C port by the USB controller. In instances where wireless charging unit is coupled to the IHS, the negotiated supply voltage may be routed to the high-power conversion circuit according to configurations of the wireless power reception unit by the embedded controller.

As described, USB-C ports may be limited to power transmissions that do not exceed 5 amps. Accordingly, supported high-power transmissions via USB-C couplings of up to 60 volts may be used to generate outputs of approximately 250 watts of power for use in rapid charging of the batteries of an IHS, supporting high-power operations of the IHS and/or powering external devices coupled to the IHS. Power transmissions received via the power port of an IHS may support currents in the range of 12 amps. In such scenarios, supported high-power transmissions via the power port of up to 60 volts may be used to generate upwards of 650 watts of power for use by an IHS. For wireless power transmission scenarios, voltages of up to 60 volts may be transmitted to the wireless reception unit of an IHS, where they may be efficiently converted to supply voltages of 18-20 volts in a manner allows the wireless charging unit to reduce the size of the power delivery coil(s) utilized by the wireless charging unit. By reducing the power that is lost during conversion of delivered wireless power, less compensation is required in the power delivery output of the wireless charging unit, thus allowing the wireless charging unit to operate at lower currents and generating less heat. By reducing the power delivery output required by a wireless power transmission unit, the power delivery coil(s) of the wireless power transmission unit may be downsized to include fewer windings, thus reducing the size and weight of the coils. This results in a similar reduction in the size and weight of the coils used by the wireless reception unit of the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for powering an Information Handling Systems (IHSs), the system comprising:
   a wireless power transmission unit configurable to generate a USB-PD (Universal Serial Bus Power Delivery) wireless power transmission, and further configurable to generate a high-power wireless power transmission of a voltage greater than voltages of the wireless USB-PD transmissions, wherein the wireless power transmission unit comprises a power circuit for generating a high-power wireless output used to generate the high-power wireless power transmission; and
   a first IHS configured to:

when a coupling to the wireless power transmission unit is detected, determine the wireless power transmission unit can be configured to generate the high-power wireless transmission;

negotiate generation of the high-power wireless transmission by the wireless power transmission unit; and configure a power circuit of the first IHS for converting the negotiated high-power wireless transmission to an input utilized by the first IHS, wherein the power circuit of the first IHS is identical to the power circuit of the wireless power transmission unit; and a second IHS configured to:
when a coupling to the wireless power transmission unit is detected and when the wireless power transmission unit cannot be authenticated by the second IHS, determine the wireless power transmission unit can be configured to generate the USB-PD-wireless power transmission;

negotiate generation of the USB-PD wireless power transmission by the wireless power transmission unit; and power the second IHS using the USB-PD wireless power transmission, wherein the second IHS comprises a power circuit that is identical to the power circuit of the wireless power transmission unit and of the first IHS, and wherein the power circuit is bypassed by the second IHS when the USB-PD wireless power transmissions have been negotiated.

2. The system of claim 1, wherein the high-power transmission comprises a nominal voltage of approximately 54 volts.

3. The system of claim 1, wherein the high-power transmission comprises a peak voltage of 60 volts.

4. The system of claim 1, wherein the power circuit of the first IHS comprises a plurality of digital voltage dividers operable for converting the high-power transmission to the input.

5. The system of claim 4, wherein the configuration of the power circuit comprises selecting a portion of the plurality of digital voltage dividers for use in the conversion.

6. The system of claim 1, wherein the input generated by the operation of the power circuit comprises greater than 200 watts of power.

7. The system of claim 1, wherein the first IHS is further configured to:
negotiate a USB-PD transmission by the wireless power transmission unit;
configure a bypass of the power circuit of the first IHS; and
route the USB-PD transmission to a battery charger of the first IHS.

8. An Information Handling System (IHS) comprising:
one or more processors;
a memory device coupled to the one or more processors, the memory device storing computer-readable instructions that, upon execution by the one or more processors, cause execution of an operating system of the IHS;
a wireless power reception unit; and
an embedded controller comprising a memory having program instructions stored thereon that, upon execution by a logic unit of the embedded controller, cause the embedded controller to:
detect a coupling of a wireless power transmission unit with the wireless power reception unit, wherein the wireless power transmission unit is configurable to generate a USB-PD (Universal Serial Bus Power Delivery) wireless power transmission, and is further configurable to generate a high-power wireless transmission of a voltage greater than voltages of the USB-PD transmissions, wherein the wireless power transmission unit comprises a power circuit for generating a high-power wireless output used to generate the high-power wireless power transmission;

when the wireless power transmission unit cannot be authenticated, negotiate generation of the USB-PD wireless power transmission by the wireless power transmission unit; and when the wireless power transmission unit is authenticated, negotiate generation of the high-power transmission by the wireless power transmission unit, and configure a power circuit of the IHS for converting the negotiated high-power transmission to an input utilized by the IHS, wherein the power circuit of the IHS is identical to the power circuit of the wireless power transmission unit and wherein the power circuit of the IHS is bypassed when the USB-PD wireless power transmissions have been negotiated.

9. The IHS of claim 8, wherein the high-power transmission comprises a nominal voltage of approximately 54 volts.

10. The IHS of claim 8, wherein the high-power transmission comprises peak voltages of 60 volts.

11. The IHS of claim 8, wherein the power circuit comprises a plurality of digital voltage dividers operable for converting the high-power transmission to the input.

12. The IHS of claim 11, wherein the configuration of the power circuit comprises selecting a portion of the plurality of digital voltage dividers for use in the conversion.

13. The IHS of claim 8, wherein the input generated by the operation of the power circuit comprises greater than 200 watts of power.

14. The IHS of claim 8, wherein execution of the instructions by a logic unit of the embedded controller further causes the embedded controller to:
when a USB-PD transmission by the wireless power transmission unit has been negotiated: configure a bypass of the power circuit of the IHS and route the USB-PD transmission to a battery charger of the IHS.

15. A method for powering an Information Handling System (IHS), the method comprising:
detecting a coupling a wireless power transmission unit with a wireless power reception unit of the IHS, wherein the wireless power transmission unit is configurable to generate a USB-PD (Universal Serial Bus Power Delivery) wireless power transmission, and is further configurable to generate a high-power transmission of a voltage greater than voltages of the USB-PD transmissions, wherein the wireless power transmission unit comprises a power circuit for generating a high-power wireless output used to generate the high-power wireless power transmission;

when the wireless power transmission unit cannot be authenticated, negotiating generation of the USB-PD wireless power transmission by the wireless power transmission unit; and power the IHS using the USB-PD wireless power transmission;

when the wireless power transmission unit is authenticated, negotiating generation of the high-power transmission by the wireless power transmission unit, and configuring a power circuit of the IHS for converting the negotiated high-power transmission to an input utilized by the IHS, wherein the power circuit of the IHS is identical to the power circuit of the wireless power transmission unit, and wherein the power circuit is bypassed when the USB-PD wireless power transmissions have been negotiated.

16. The method of claim 15, wherein the high-power transmission comprises a nominal voltage of approximately 54 volts.

17. The method of claim 15, wherein the high-power transmission comprises a peak voltage of 60 volts.

18. The method of claim 15, wherein the power circuit comprises a plurality of digital voltage dividers operable for converting the high-power transmission to the input.

19. The method of claim 18, wherein the configuration of the power circuit comprises selecting a portion of the plurality of digital voltage dividers for use in the conversion.

20. The method of claim 15, further comprising:
when a USB-PD transmission by the wireless power transmission unit has been negotiated, configuring a bypass of the power circuit of the IHS and routing the USB-PD transmission to a battery charger of the IHS.

* * * * *